3,563,847
POLYCARBONATE MODIFIED POLYESTER REIN-
FORCING ELEMENTS AND RUBBER STRUC-
TURES MADE THEREFROM
Grover W. Rye, Cuyahoga Falls, and Thomas E. Evans,
Massillon, Ohio, assignors to The Goodyear Tire &
Rubber Company, Akron, Ohio, a corporation of Ohio
No Drawing. Filed June 14, 1968, Ser. No. 736,964
Int. Cl. C08d *11/04;* C08f *45/62;* C08g *39/10;*
D02g *3/48*
U.S. Cl. 161—176                                    5 Claims

ABSTRACT OF THE DISCLOSURE

Relates to an improved rubber structure reinforced with an improved polyester reinforcing fiber modified with a polycarbonate added to the polyester prior to fiber formation.

This invention relates to an improved rubber structure reinforced with an improved polyester reinforcing fiber modified with a polycarbonate added to the polyester prior to fiber formation.

Pneumatic tires are being subjected to increasingly severe operating conditions including high speeds and heavy loads. Rubber used in the tire is reinforced with such materials as rayon, nylon, polyester, wire, and glass fibers. Maximum reinforcement of the rubber is obtained with a given fiber when maximum adhesion is produced between the rubber and fiber. Polyethylene terephthalate tire cords are particularly desirable to use as reinforcing elements because of their excellent dimensional stability as shown by low growth during service. However, it has been observed that in the environment of the rubber of a pneumatic tire the heat generated under high speeds and heavy loads causes the polyester cord to lose tensile strength and ultimately adhesion to the rubber.

The chemical environment of the rubber of a tire is complex because many different chemicals are needed in its construction in order to obtain maximum performance from the tire. Because of this chemical complexity in the rubber and the severe heating developed during service, a variety of chemical reactions result in the degradation of the polyester cord and the adhesive bond between the cord and the rubber.

Many attempts have been made to minimize these destructive forces and the present invention is an advance in solving the problems created by these destructive forces. Prior attempts have been made by modifying the rubber. Other attempts have been directed toward the adhesive. The present invention is directed toward the polyester cord.

It has now been discovered that a more thermally stable pneumatic tire may be made when the rubber thereof is reinforced with a modified polyester cord described herein.

The thermally stable tire is made possible by the discovery that a polyester cord used in the construction of the pneumatic tire can be protected against tensile loss in the cord and degradation of the adhesive bond between the cord and the rubber by incorporating in the polyester prior to fiber formation a critically small amount of a modifier for the polyester which modifier is (1) physically and chemically compatible with the polyester, (2) reactive with the polyester within the limitation of time and temperature existing in an extruder used in melt spinning the polyester, (3) of the proper melt viscosity to prevent dripping of the spun resin which may occur when the melt viscosity is too low and to prevent excessive pack pressure during extrusion which may occur if the melt viscosity is too high, (4) of such nature that its degradation products will not be harmful to the polyester otherwise a drop in tensile will occur, (5) of such a nature as to impart or not interfere with good spinning and drawing of the polyester control of which may be achieved by controlling the reaction during extrusion, otherwise if no control is possible then excessive crosslinking may occur and the resin will be difficult to properly draw, and (6) of a high melting point and a low vapor pressure thereby imparting efficiency in the processing of the material being drawn. Such a modifier has been discovered to be a polycarbonate. The polycarbonate as a powder or fine particles is added to the polyester usually in the form of chips or granules and the mixture is then passed to a melting zone as in an extruder and then forwarded by means of gear pumps or the like to a filter pack and a spinneret from which filaments are formed in a continuous manner. A number of these filaments are gathered into a yarn, which yarn is then twisted to form a ply, a number of which plies are then twisted to form a cord. One type of fiber forming process is shown in U.S. Pat. 2,987,373.

Any polycarbonate, when used in the amount discovered necessary in the performance of this invention, may be used as an additive or modifier or scavenger or protective agent for polyester tire cord. Broadly, the polycarbonates may be any derived from a 4,4'-dihydroxy-di(mononuclear aryl)-alkane and having a degree of polymerization (n) between about 10 and about 400. These polycarbonates can be prepared in accordance with conventional methods including phosgenation in which phosgene is blown into the 4,4'-dihydroxy-di(mononuclear aryl)-alkane in the presence of an aqueous solution of a caustic alkali and a solvent. The ester-interchange method may also be used wherein a 4,4'-dihydroxy-di(mononuclear aryl)-alkane is reacted with a diester of carboxylic acid and as more fully described in British Pat. 772,627.

The polycarbonate used in the present invention was a polyester of carbonic acid and bis phenol A known as [bis-(4-hydroxy phenyl)2,2,propane] and having the repeating unit structure

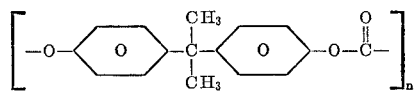

wherein $n$ is a measure of the molecular weight and may be at least 10 and up to 400.

It has been observed that the polycarbonate may be added to the polyester prior to fiber formation in any physical state dependent, of course, upon the nature of the equipment available in carrying out the blending of the polycarbonate with the polyester. It is preferred to add the polycarbonate in pellet form to the polyester chips just prior to the introduction of the mixture into the extruder associated with the spinning of the resulting molten mixture into filaments.

The improvements of this invention are observed when less than about 2 parts by weight of polycarbonate is added to 100 parts of polyester and in more than about .10 part. It is essential that when the polycarbonate is to be intimately blended with the polyester in the molten state which occurs in the range from about 270° C. to about 310° C. that the molten blend be maintained under a pressure of about 800 lbs. per square inch and out of contact with oxygen, a condition present in melt spinning apparatus.

The improved fiber to be used in this invention is made as indicated above by adding a polycarbonate to a polyester. The polyester is any fiber forming thermoplastic linear high molecular weight condensation polyester, and particularly polyethylene terephthalate as well as polymers of cyclohexanedimethylene terephthalate. These polyesters as well as copolyesters of aromatic dicarboxylic acids and particularly condensation products of ethylene glycol with a mixture of terephthalic acid and isophthalic acid, ethylene glycol with terephthalic acid and another dibasic acid such as sebasic or adipic acid or hydroxycarboxylic acid such as parahydroxy benzoic acid present in small amounts and polyesters of trephthalic acid with the glycol 1,4 bis(hydroxymethyl) cyclohexane. By linear terephthalic polyesters is meant a linear condensation polyester comprising recurring glycol dicarboxylate structural units in which at least about 85% of the recurring structural units are units of the formula

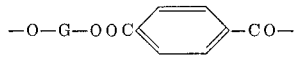

wherein G represents a divalent organic radical containing from about 2 to about 8 carbon atoms which is attached to the adjacent oxygen atoms by saturated carbon atoms. The terephthalate radical may be the sole dicarboxylate constituent of the recurring structural units or up to about 15% of the structural units may contain other dicarboxylate radicals such as adipate, sebacate, isophthalate, 4,4' bibenzoate and hexahydroterephthalate. By high molecular weight is meant polyesters having an intrinsic viscosity of at least 0.4 and preferably greater than 0.6 and as high as 1.5 as measured in a 60/40 phenol/tetrachlorethane mixed solvent at 30° C. It is preferred that the polyethylene terephthalate and other similar polyesters have a high melting point which for polyethylene terephthalate is about 265° C. measured with a hot stage polarizing microscope. Generally the polyester fibers of this invention may be prepared in accordance with well-known procedures for melt extrusion and drafting.

The rubber component of the rubber structure of this invention may be any rubber that is a stretchable composition having a tendency to return to its approximate original shape after being vulcanized, and particularly any rubber that is used in the manufacture of tires and drive belts. Thus, the laminate of this invention may involve natural rubber otherwise known as Hevea Brasiliensis, or conjugated diene polymeric rubbers made by polymerizing butadiene-1,3, isoperene, 2,3-dimethyl butadiene-1,3, and mixtures of these conjugated dienes as well as copolymers of these diene monomers with up to 50% of compounds which contain a $CH_2{=}C{=}$ group and which are copolymerizable with butadiene-1,3 where, for example, at least one of the valences is attached to an electro-negative radical, that is, a radical which increases the polar character of the molecule such as vinyl, phenyl, nitrile and carboxy radicals. Examples of the diene rubbers are polybutadienes including the stereospecifics, polyisoprenes including the stereospecifics, butadiene/styrene copolymers, also known as SBR, and butadiene/acrylonitrile copolymers also known as NBR.

The following example discloses how an improved polyester cord may be made by adding polycarbonate to polyester chips and then forming filaments therefrom.

EXAMPLE I 100 parts of dried polyethylene terephthalate (PE) chips were tumbled with 2 parts of the polycarbonate resulting from the reaction of bis-phenol A and carboxylic acid in equal molecular equivalent amounts to form a linear molecule having the repeating structural unit

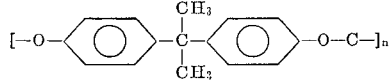

wherein $n$ is a measure of the molecular weight and may be 10 and up to 400. When the molecular weight corresponds to an intrinsic viscosity of .5 measured at 25° C. in dichloromethane, as in this example, the polycarbonate is commercially available as Merlon Resin M 39 sold by Mobay. The mixture is tumbled until it becomes substantially homogeneous. The resulting polycarbonate blend polyester (MPE) is melt spun at a temperature of 290° C. through a 190 hole spinnert at a spinning speed of 150 yards per minute to give a single spun yarn having a total denier of approximately 7800. The spun yarn is passed to a pair of rotating heated feed rolls and then passed around a pair of heated draw rolls rotating at a speed to impart a draw ratio of about 6 to 1 to give a total denier of approximately 1300 and then wound on a bobbin. The polycarbonate modified polyester yarn had a tenacity of 7.9 grams per denier, a break elongation of 12.4%, an intrinsic viscosity of .790, a tensile strength of 23.3 lbs., and an elongation at 10 lbs. pull of 5.6%.

The yarn produced above is plied 8 turns per inch, 3 of these plies are twisted in reverse direction 8 turns per inch to form the cord used in producing the improved rubber structure of this invention. The resulting cord had a break strength of 62.9 lbs., a 5% modulus (lase) of 14.3, a 10% modulus (lase) of 29.0, and an elongation at break of 17.8%. The resulting polycarbonate modified polyester cord is identified as cord sample A. The unmodified polyester was processed into filaments and a cord made in the exact manner described above and identified as cord sample B. Both cord samples A and B were treated with an R/F/L adhesive made in the following manner: A 20% solids dispersion of a conventional R/F/L adhesive is made by adding 8.9 parts of resorcinol to 6.55 parts of a 37% solution of formaldehyde and 5 parts of a 10% solution of sodium hydroxide which is then added to a latex mixture comprising 35.5 parts of a 49.5% total solids of the 70/15/15 terpolymer of butadiene/styrene/vinyl pyridine and 64 parts of a 40.7% total solids of a 70/30 copolymer of butadiene/styrene, the mixture being in 130.05 parts of water. Certain of the cords are passed through a dip tank containing this adhesive. The dipped cords are then dried at 450° F. and embedded in rubber compounded as shown below and then peel adhesion test is made of a one-inch strip under static conditions at 250° F. Thermal stability of the cord is measured in terms of percent tensile retained by the closed glass tube method (GT) or by the air bomb method (AB). Glass tube testing is done by heating the untreated cord for 48 hours at 300° F. Air bomb testing is done by heating the untreated cord embedded in the rubber compound as shown below for 2.5 hours at 350° F. under 80 p.s.i. air pressure. The folowing data were obtained:

TABLE I

| Example | Adhesive 1″ strip hot static | Percent tensile retained |
|---|---|---|
| (1) Control (PE cord 1,300/3, 8/8) | 100 | 100 AB |
| (2) MPE (PE plus 2 parts polycarbonate, cord 1,300/3, 8/8). | 145 | 107 AB |
| (3) Control (PE cord 1,000/3, 10/10) | | 100 GT |
| (4) MPE (PE plus 2 parts polycarbonate cord 1,000/3, 10/10). | | 122 GT |
| (5) MPE (PE plus 1 parts polycarbonate cord 1,000/3, 10/10). | | 107 GT |

The polyester cords used in these examples were made by first twisting yarn 8 to 10 turns per inch and then twisting threeof these singles 8 or 10 turns per inch to form a cord.

The polyester cord is embedded in rubber compounded in acordance with the following formula:

| Ingredients | Parts by weight | |
| --- | --- | --- |
| | Amount used | May be used |
| (1) Natural rubber | 70 | 0-100 |
| (2) OE/SBR 1778 (styrene/butadiene-1,3 23.5/76.5 copolymer) plus 37-½ parts oil per 100 SBR) | 27.5 | 100-0 |
| (3) Cis 1,4-polybutadiene | 10 | 0-50 |
| (4) Carbon black (reinforcing agent) | 40 | 25-100 |
| (5) Zinc oxide (activator of cure) | 4 | 2-10 |
| (6) Stearic acid (activator of cure) | 2 | 1.5-3.0 |
| (7) Primary accelerator (2,2'-dithiobisbenzothiazole) | 1.25 | .5-3.0 |
| (8) Pine oil (softener) | 10 | 2-50 |
| (9) Secondary accelerator (tetramethylthiuram disulfide) | .10 | .05-1.0 |
| (10) Antioxidant (hindered phenol) | .60 | .1-4 |
| (11) Sulfur (vulcanizing agent) | 2.5 | 1.0-5.0 |

In compounding the rubber stock in accordance with the formulation set forth above, a masterbatch of ingredients 1 and 2 are made with the carbon black and mixed on a mill to a temperature of about 110° C. and may be mixed at a temperature as high as 140° C. The resulting carbon black masterbatch is then cooled and the remaining compounds are mixed into the batch in the order indicated above to a temperature of about 70° C. and may be mixed at a temperature as high as 100° C.

The rubber structure of this invention may be prepared by first coating a reinforcing fabric with the rubber and then using the rubber coated fabric to make any desired structure as, for example, a pneumatic tire. The rubber will be compounded in the manner set forth above. The reinforcing fabric may be used without any previous treatment, and under these conditions the fabric is known as grey cord indicating that no treatment in the form of an adhesive composition has been applied to the surface of the cord. Thus, the present invention may be used in the manufacture of a pneumatic tire of conventional present day design as shown for example, in each United States patents as 3,157,218; 3,160,191; 3,160,192; 3,217,778; 3,225,810; 3,225,812; 3,244,215; 3,253,633 and 3,253,638 all of which show a vulcanized rubberized fabric carcass of generally toroidal shape having a tread portion superimposed and bonded to the crown area of the carcass and plies of rubberized fabric forming sidewalls extending from the tread over the carcass to the bead portion.

While certain representative embodiments and details have been shown for the purpose of ilustrating the invention it will be apparent to those skilled in this art that various changes and modification may be made therein without departing from the spirit or scope of the invention.

What is claimed is:

1. A heat stable structure comprising a heat stable polyester tire cord bonded to rubber, the cord being made of polyethylene terephthalate fibers melt spun from a melt composition resulting from melting a physical mixture of polyethylene terephthalate having an I.V. of at least .6 and a polycarbonate derived from a 4,4'-dihydroxy-di (mono nuclear aryl)-alkane present in the mixture in an amount between about .1 part to about 2 parts per 100 parts of polyester.

2. The structure of claim 1 wherein the polycarbonate has a degree of polymerization between 10 and 400.

3. The structure of claim 1 wherein the polycarbonate in the mixture is a polyester of carbonic acid and bis(4-hydroxy phenyl)2,2-propane.

4. A method of improving the heat stable characteristics of a melt spun polyester fiber which comprises melt spinning a melt composition resulting from the melting of a physical mixture of polyethylene terephthalate having an I.V. of at least .6, and a polycarbonate derived from a 4,4'-dihydroxy-di(mononuclear aryl) alkane present in the mixture in an amount between about .1 part to about 2 parts per 100 parts of polyester.

5. The fiber of the method of claim 4.

References Cited

UNITED STATES PATENTS

| | | | |
| --- | --- | --- | --- |
| 3,051,212 | 8/1962 | Daniels | 260—75 |
| 3,207,814 | 9/1965 | Goldberg | 260—860 |
| 3,313,862 | 4/1967 | Siggel et al. | 260—860 |
| 3,378,055 | 4/1968 | Robertson | 152—359 |
| 3,398,212 | 8/1968 | Jackson et al. | 260—860 |

FOREIGN PATENTS

| | | | |
| --- | --- | --- | --- |
| 132,546 | 5/1949 | Australia | 260—860 |
| 703,087 | 2/1965 | Canada | 260—860 |
| 1,111,824 | 7/1961 | Germany | 260—75 |

HAROLD D. ANDERSON, Primary Examiner

E. WOODBERRY, Assistant Examiner

U.S. Cl. X.R.

156—330, 359; 161—172, 175, 231; 260—45.7, 45.8, 45.75, 75, 858, 860